April 14, 1931.        E. A. NELSON           1,800,955
                    RIM MANIPULATING TOOL
              Filed July 11, 1930    2 Sheets-Sheet 1

Inventor

Emil A. Nelson.

By Harness, Dickey, Pierce & Hazen
                            Attorney

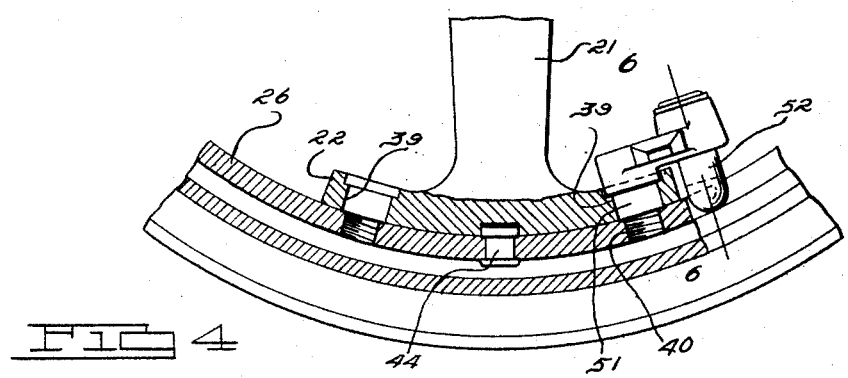
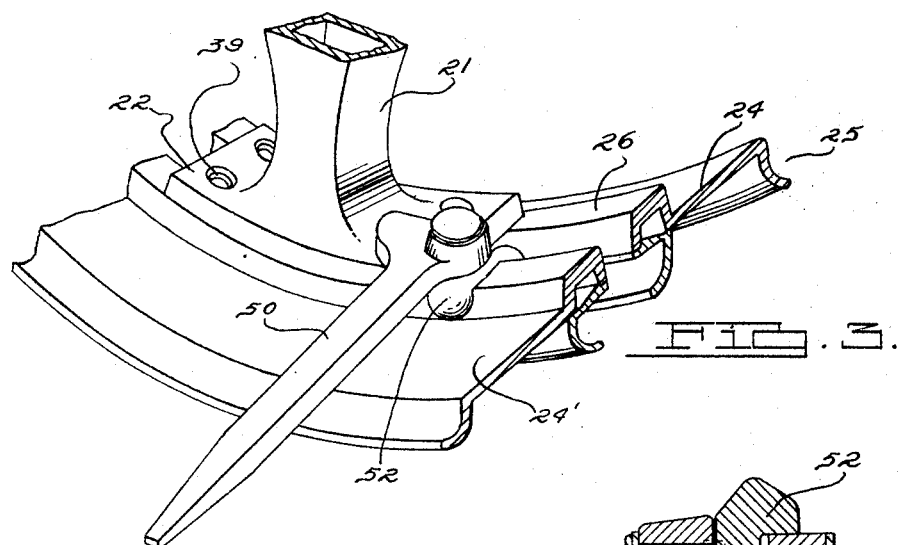
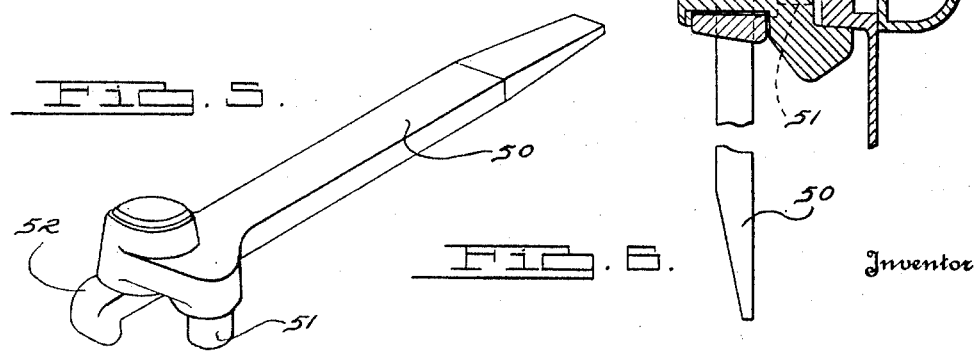
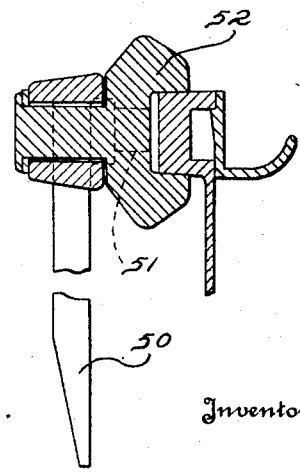

Patented Apr. 14, 1931

1,800,955

UNITED STATES PATENT OFFICE

EMIL A. NELSON, OF DETROIT, MICHIGAN

RIM-MANIPULATING TOOL

Application filed July 11, 1930. Serial No. 467,308.

Extensive use is now made of cast wheels whose spokes outwardly terminate in separate seats for a rim or rims,—rugged cooperating rims of a special type being so constructed and so applied, one or more to a wheel, as to obviate all need for integral interconnection of said seats; and it is an object of the present invention (accordant with the disclosure of my application Serial No. 292,281, filed July 12, 1928) to provide a special tool, of wrench type, which is especially designed for cooperation with said seats and rims. This tool is highly effective in such operations as the application and removal of the mentioned rims by a cam action in relation to the special seats referred to,—the principle of operation being such as to render it useful in the securing of outer annular elements relatively to inner parts which are adapted closely to interfit therewith, especially in case said outer elements are each provided with a face or substantially parallel faces approximately perpendicular to the axes of said elements.

For the sake of clarity and completeness, typical features of wheel constructions are herein illustrated and described; and other objects of the present invention may be best appreciated from the following description of illustrative embodiments thereof, taken in connection with the appended claims and the accompanying drawings, in which:

Fig. 3 is a detail perspective view, on a larger scale, and taken somewhat as implied by the arrows 3 of Figs. 1 and 2, showing a special tool in use.

Fig. 4 is a view comparable with Fig. 3, but taken from the direction in which a tool handle extends and showing wheel parts in vertical section.

Fig. 5 is a separate perspective view of the tool which is shown in use in Figs. 3 and 4.

Fig. 6 is a sectional view through said tool,—taken substantially as suggested by the line 6—6 of Fig. 4, but with parts broken away.

Figure 1:
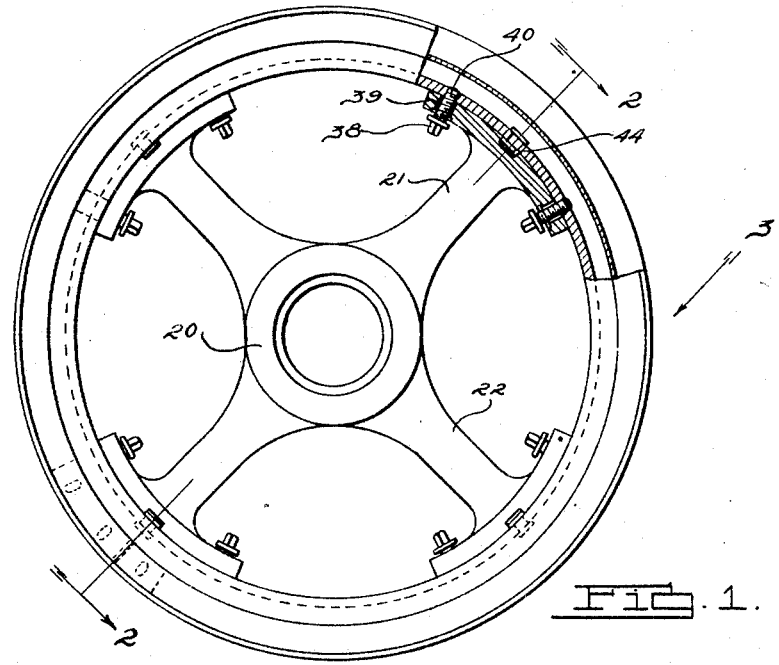
Fig. 1 is a side elevational view, with parts sectioned substantially to the level indicated by the line 1—1 of Fig. 2, and with tires omitted.

The accompanying drawings show a wheel comprising a hub portion 20 as provided with four integral and radially extending spokes 21, each of which outwardly terminates in a pair of flange-like seat portions,—outer seat portions 22 and inner seat portions 23 being provided with substantially cylindrical surfaces for engagement by separate rims and the respective pairs of seat portions being disconnected circumferentially of the wheel.

Each rim may comprise a base 24 and a marginal flange ring 25,—which may be formed integrally with said base, as shown, or may be an endless ring formed separately therefrom and held against lateral displacement in any suitable way. Instead of forming the opposite sides of the rim as in conventional construction, I herein form it with an inwardly extending enlarged marginal portion 26,—shown as having a transverse diameter less than that of the opening between the seats 22 and 23 and as shaped not only to provide a marginal ring-retaining flange and a seat-engageable annular surface but to strengthen the entire rim and to provide oppositely facing completely annular surfaces favorably disposed for engagement by cam surfaces of an interfitting yoke member comprised in the rim-manipulating tool.

The enlarged marginal portions 26 are intended to be of such strength as to obviate need for use of felloes. The rims comprising the same may be of identical size and construction but oppositely faced, one marginal portion being received on the seats 22 and the other received on the seats 23. Two fastening devices such as screw members 38 may be provided for each seat 22, 23; each screw may extend in a substantially radial direction through a threadless opening 39,—one opening being provided on either side of the corresponding spoke 21; and each screw may be threaded into an opening 40 in the enlarged portion 26 of a rim. The screws 38 may thus serve finally to draw the rims, after the latter have been brought,—as by the novel tool upon which protection is herein sought, radially into contact with their respective sets of seats 22, 23. The inside diameter of the marginal portion 26 may advantageously be substantially the same as the effective diameter of the mentioned seats,— affording a "press" fit therewith when the rim is circular; and, in the application of the rims to the seats, said rims may or may not be slightly sprung or "chorded" between the spokes 21, to facilitate their application to the wheel.

To afford guidance during a final inward movement of each rim in relation to the seats provided therefor, each seat 22 is shown as provided with an outwardly opening slot or groove 42, and each seat may be provided with a similar groove 43,—the grooves 42 and 43 terminating short of the width of the respective seats 22 and 23; and each rim portion 26 may be provided with cooperating guide means such as four inwardly projecting lug members 44, spaced circumferentially of the rim in exact accordance with the uniform spacing of the grooves 42 and 43,—at a quadrant's distance in case the spokes 21 are four in number. The lugs or stop members 44 when provided on the rings may be identically positioned with respect thereto; the grooves 42 and 43 should be understood to be so terminated that when the respective rims are applied, with lugs 44 brought to their limiting position by abutting the ends of said grooves, the respective pairs of cooperative openings 39 and 40 are in alignment; and, as indicated, the present invention contemplates the use of an improved tool and technique in the bringing of the mentioned lugs into the relationship here referred to.

Figure 2:
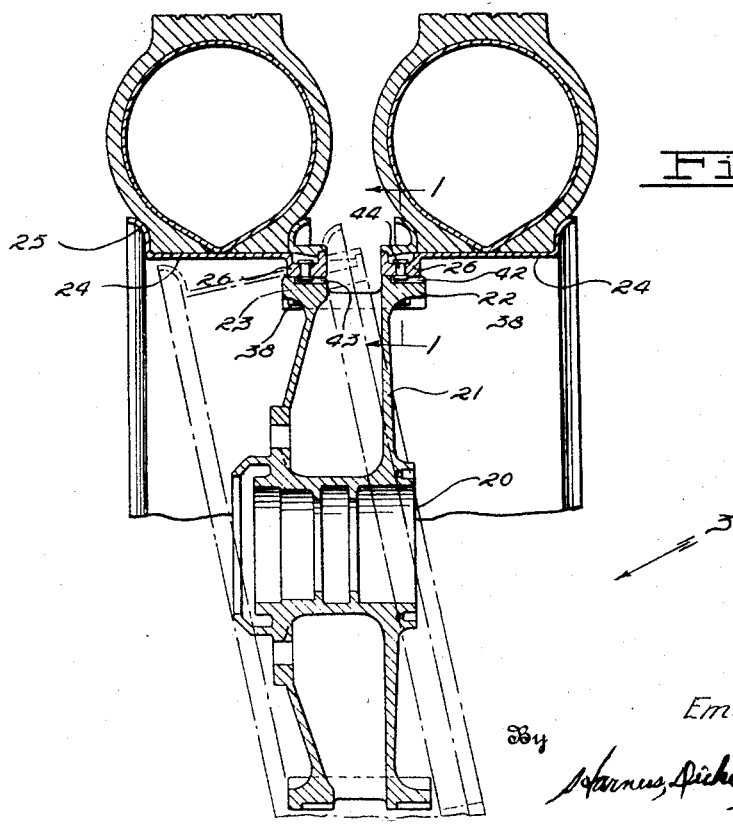
Fig. 2 is a sectional view, taken substantially as indicated by the line 2—2 of Fig. 1.

In applying an inner rim to a wheel the following procedure was early suggested by me: The inner rim being disposed with its seat engageable portion 26 outward, said rim may be so rotated as to bring the lugs 44 between adjacent seats 22. The rim may then be advanced into proximity with seat 23 and so rotated as to bring its lugs 44 into alignment with slots 43,—enabling the rim to be moved further inward, until the lugs 44 seat against the inner ends of said groove. However, the originally illustrated proportions of the seats turned out to be such as to obviate all necessity for the mentioned rotation of the inner rim after a sliding of the same axially over the seats 22, and to permit said rims to be applied by a so-called "hook-on" method,—which takes advantage of the illustrated openings provided at the outer ends of the spokes and between seats 22 and 23. That is to say, it being easiest to rotate a rim relatively to rim seats before it is applied, spokes 21 being preferably brought initially into diagonal positions, a tire-carrying rim intended to occupy the inner position may be so rotated as to bring a pair of its lugs 44 opposite a pair of slots 43; the top of said rim may next be inwardly inclined and "hooked over" a seat or an upper pair of seats 22,—the drop then permitted by the mentioned openings or depressions between the seats 22 and 23 at the ends of the respective spokes being sufficient to enable the flange 25, the base 24, and the seat-engageable marginal portion 26 of a rim initially occupying such a position as that indicated in dotted lines in Fig. 2 to clear the laterally and downwardly-inclined spokes 21 and the rim seats 22 thereon,—in such manner that all four of the lugs 44 may directly enter the corresponding slots 43. Being thus brought into coaxial relationship with the hub 20, the inner rim may then be directly advanced to the indicated limit by means of the special hand tool shown. It will be obvious that another rim 24', with its seat-engaging portion 26 disposed oppositely to that of the inner rim 24, may then be directly applied by similar steps; and the tool shown in Figs. 4–6 inclusive may advantageously be employed in connection with either the application or the removal of either an inner rim or an outer rim of the described character.

The special tool referred to is shown as comprising a handle portion 50 terminated suitably to its use for a prying effect and provided with a head having a pivot pin 51, an offset yoke or cam jaw member 52 being carried by said head and preferably by an additional pivot pin spaced from the mentioned pin and having its axis parallel therewith. When it is desired to complete the application of a rim to a wheel to the limit position predetermined by engagement of lugs 44 with the ends of slots 43, or to start the removal of a rim from a wheel, the threaded or other fastening means 38 being so withheld or withdrawn as to permit a sliding movement of a seat-engaging marginal or other portion 26 of a rim relatively to a cooperating rim seat 22 or 23, the pin 51 of this tool is intended to be inserted into one of the openings 39, providing a threadless surface for engagement therewith, substantially as implied by Figs. 3 and 4,—with the oppositely facing surfaces of the jaws of the yoke member 52 engaging opposite and substantially parallel annular flat surfaces of the marginal portion 26 of that rim that is to be manipulated. The handle is then turned upon the pin 51 as a pivot, with the result that the yoke member 52 forces the rim axially of the wheel,—by a cam action in which the handle 50 acts as the longer arm of a lever and guidance is afforded by engagement of lugs 44 in slots 43, or by equivalent means.

It will be evident that the rims, one or more to a wheel, are easily and reliably located, by the described lug and tool and in view of the described construction, properly to receive their respective fastening means; and, although the foregoing description has included details of but one embodiment of the present invention, it should be understood not only that various features thereof might be independently employed but also that numerous modifications, additional to any suggested herein, might easily be devised by skilled workers, if informed of the foregoing,—all without departure from the scope of the present invention as the latter is indicated above and in the following claims.

What I claim is:

1. For use in the manipulation of a rim comprising a strength-imparting seat-engageable portion which provides oppositely facing annular cam-receiving surfaces, relatively to a seat which has a pin-receiving opening therein, a tool which comprises: a handle serving as one arm of lever; and a head which carries both a pin, to enter said opening, and a yoke member providing oppositely facing surfaces spaced and disposed for engagement of said annular surfaces.

2. For use in the manipulation of a rim comprising a strength-imparting seat-engageable portion which provides oppositely facing annular yoke-receiving surfaces, relatively to a seat which has a pin-receiving opening therein, a tool which comprises: a handle serving as one arm of a lever; and a head which carries both a pin, to enter said opening, and a yoke member providing oppositely facing surfaces spaced and disposed for engagement of said annular surfaces,—said yoke member being movable relatively to said head.

3. For use in the manipulation of a rim comprising a strength-imparting seat-engageable portion which provides oppositely facing annular yoke-receiving surfaces, relatively to a seat which has a pin-receiving opening therein, a tool which comprises: a handle serving as one arm of a lever; and a head which carries both a pin, to enter said opening, and a yoke member providing oppositely facing surfaces spaced and disposed for engagement of said annular surfaces,—said yoke member being pivoted to said head and said pin being transversely spaced therefrom.

4. A rim wrench comprising, in combination, a handle provided with a perpendicularly extending pin at one end thereof, and a yoke member so carried by said handle as to pivot about an axis parallel to but laterally spaced from that of said pin, said yoke member providing oppositely inwardly facing and substantially parallel cam surfaces spaced for engagement with oppositely outwardly facing annular surfaces upon a rim.

5. For use in the manipulation of a rim comprising a strength-imparting seat-engageable portion which provides oppositely facing annular cam-receiving surfaces, relatively to a seat which has a pin-receiving opening therein, a tool which comprises: a handle serving as one arm of a lever; and a head which carries both a pin, to enter said opening, and a cam member for engagement of said surfaces,—said surfaces being substantially parallel and said cam member being so formed as to provide jaws spaced for engagement with said surfaces respectively.

EMIL A. NELSON.